United States Patent [19]

Parkin

[11] 4,180,849
[45] Dec. 25, 1979

[54] PEDAL CYCLE HEADLAMP

[75] Inventor: Sidney J. Parkin, London, England

[73] Assignee: The Ever Ready Company (Great Britain) Limited, London, England

[21] Appl. No.: 825,741

[22] Filed: Aug. 18, 1977

[30] Foreign Application Priority Data

Aug. 18, 1976 [GB] United Kingdom ............... 34510/76

[51] Int. Cl.² ............................................. F21V 33/00
[52] U.S. Cl. ..................... 362/72; 362/326; 362/339
[58] Field of Search .......... 362/72, 308, 309, 339, 362/337, 327, 311

[56] References Cited

U.S. PATENT DOCUMENTS

| | | | |
|---|---|---|---|
| 3,525,068 | 8/1970 | Nelson | 339/88 R |
| 3,619,603 | 11/1971 | Odle | 362/339 |
| 3,761,957 | 9/1973 | Jarrett | 362/339 |
| 3,867,002 | 2/1975 | Bridgies | 339/88 R |

Primary Examiner—Benjamin R. Padgett
Assistant Examiner—J. L. Barr
Attorney, Agent, or Firm—Sughrue, Rothwell, Mion, Zinn and Macpeak

[57] ABSTRACT

A transparent lens for the front of a pedal cycle headlamp has a first set of elongated prisms arranged to extend horizontally and thereby modify the transmitted light distribution in the vertical direction and a second set of elongated prisms arranged to extend vertically and thereby modify the transmitted light distribution in the horizontal direction, the prisms extending over only part of the lens area thereby leaving part of the lens area through which light may be transmitted without modification by the prisms.

11 Claims, 6 Drawing Figures

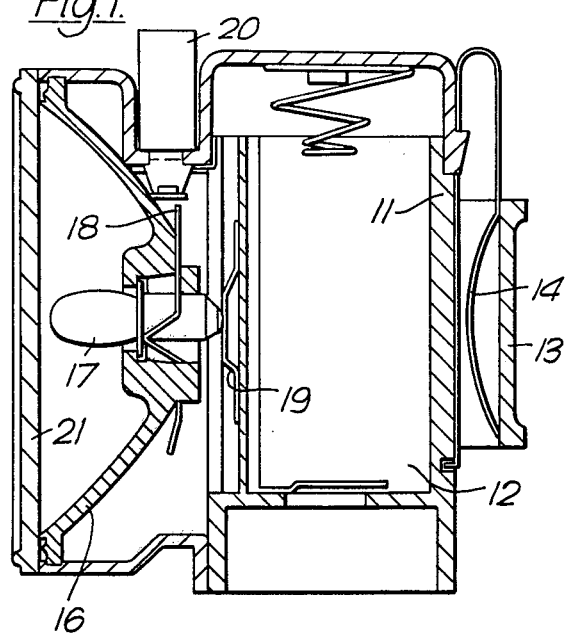
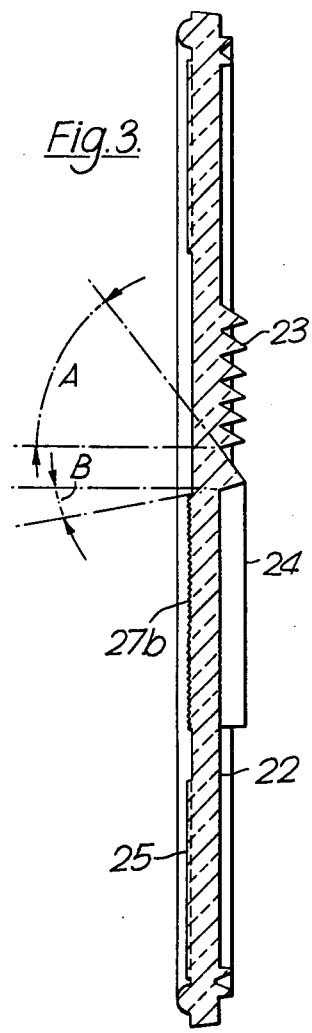
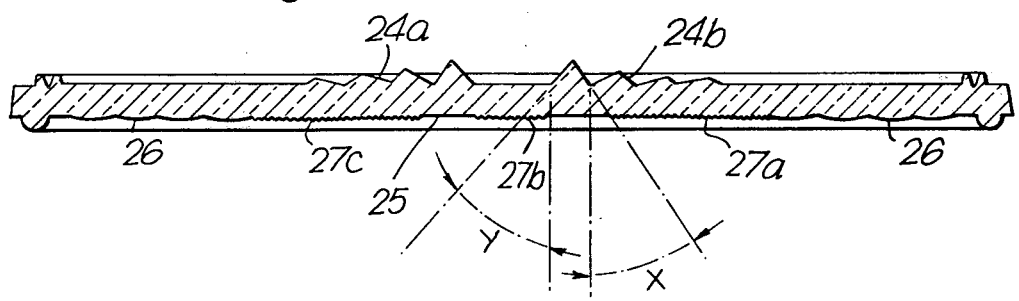

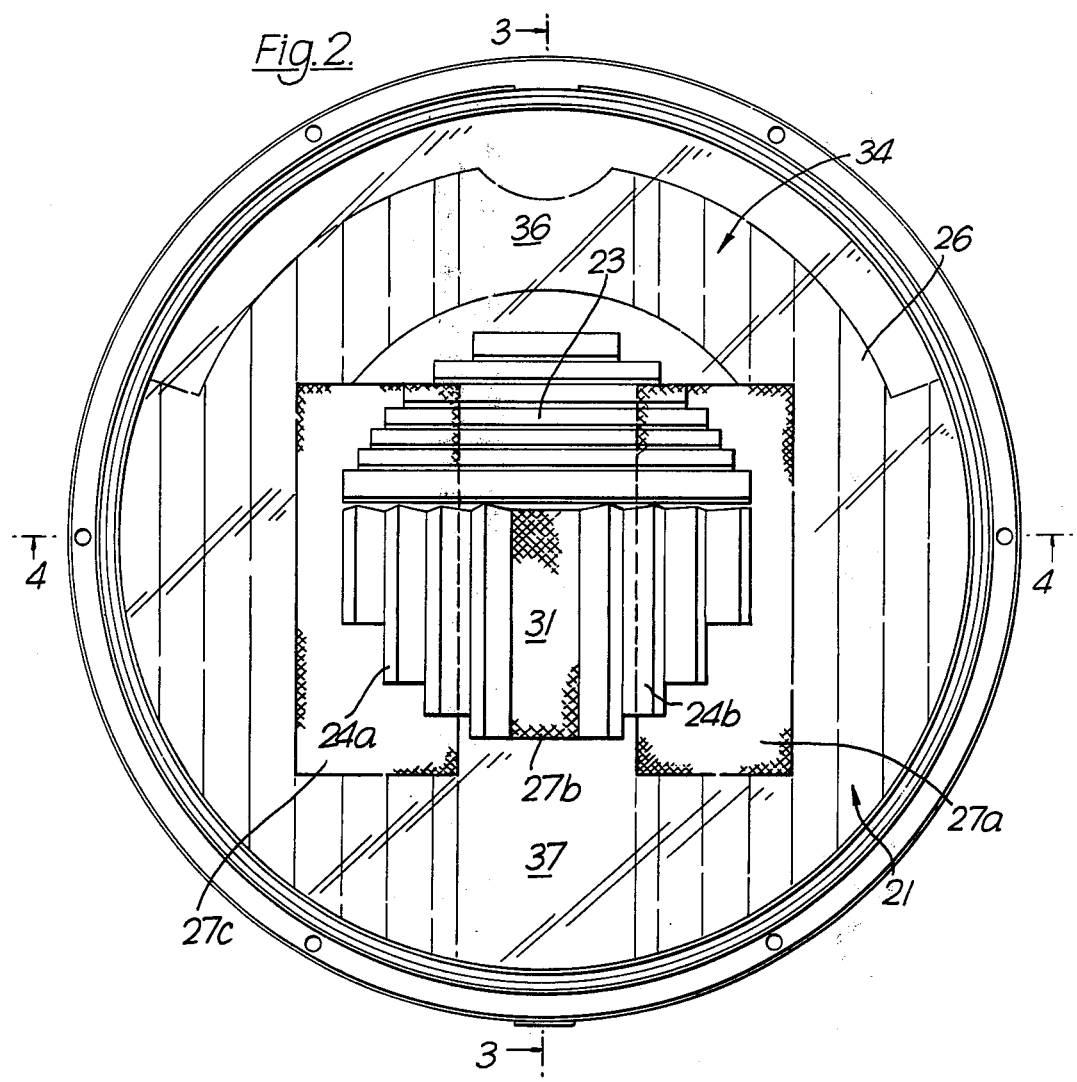

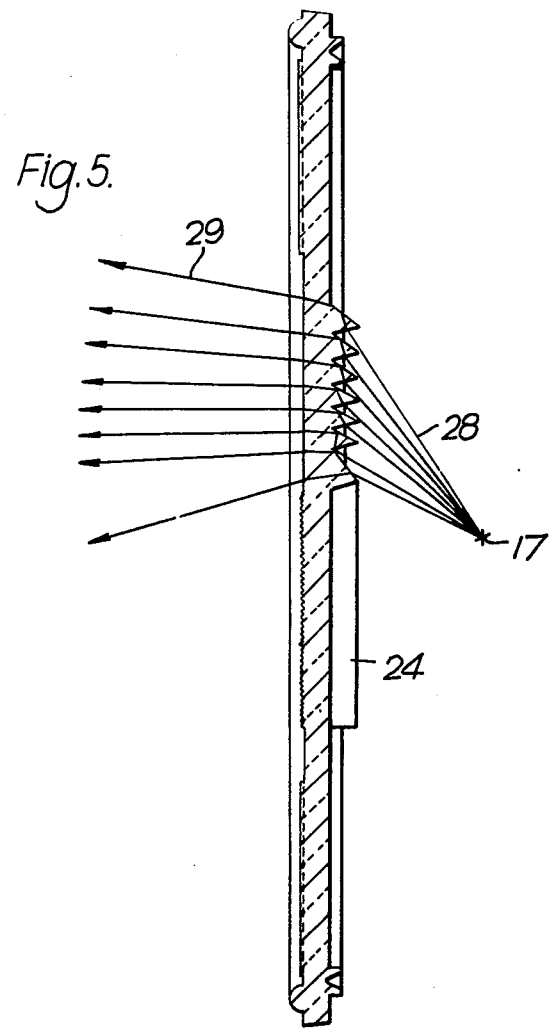
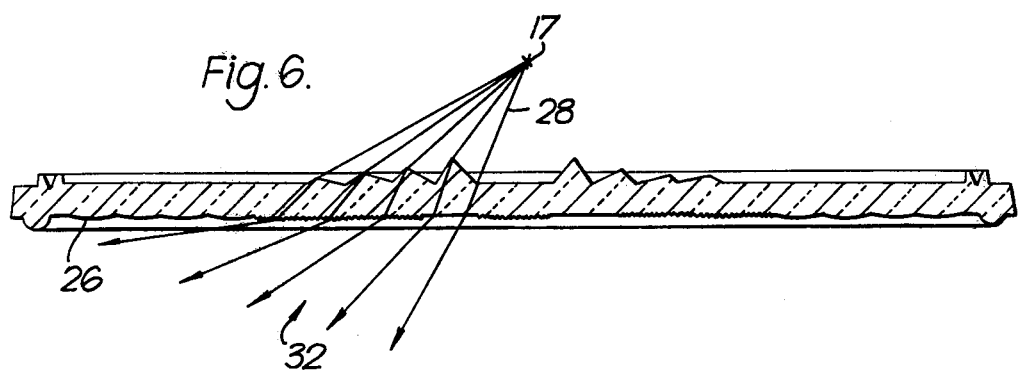

PEDAL CYCLE HEADLAMP

BACKGROUND OF THE INVENTION

The invention relates to pedal cycle headlamps and to lenses for use in pedal cycle headlamps.

It is well known to provide pedal cycle headlamps which may be dynamo operated or battery operated and which include a filament bulb located substantially centrally in a reflector and arranged to direct light through a front glass or other light transmitting member. In accordance with the present invention, such a glass or light transmitting member is adapted to modify the light distribution transmitted and is referred to as a lens. It is however to be understood that the term "lens" is used in this specification is not to be limited to a member having convex or concave surfaces but may include any shaped formation used to modify the light distribution of transmitted light.

SUMMARY OF THE INVENTION

The present invention provides a lens for a pedal cycle headlamp, which lens comprises a transparent member adapted to fit the front of a cycle headlamp, said member having formed thereon a first set of elongated prisms arranged to extend horizontally and thereby modify the transmitted light distribution in the vertical direction and a second set of elongated prisms arranged to extend vertically and thereby modify the transmitted light distribution in the horizontal direction, the prisms extending over only part of the lens area thereby leaving part of the lens area through which light may be transmitted without modification by the prisms.

Preferably the second set of prisms comprises two groups of prisms symmetrically arranged on opposite sides of a central vertical axis of the lens and preferably the two groups are spaced apart to provide a central region between them having no prism formation.

Preferably the first set of prisms is offset above or below the centre of the lens thereby providing a central region of the lens through which light may pass unmodified by the prisms. Preferably said central region is formed by part of the lens having flat parallel front and back faces.

Preferably the first set of prisms is located symmetrically above the central axis of the lens.

In one embodiment the prisms of the first set have faces of varying inclination to the plane of the lens so as to provide a desired modification of the light distribution.

The prisms of the second set of prisms may also have faces of varying inclination to the plane of the lens and if desired the height of the prisms may be varied, for example, by a progressive reduction in the height of the prisms on moving away from the centre of the lens.

Preferably at least part of the lens area having no prisms is provided with elongated lens elements extending in a vertical direction. Preferably the lens elements are provided on an annular region of the lens surrounding the first and second sets of prisms.

Preferably light diffusing means is provided on at least part of the area of the lens. Preferably diffusing means is provided in a central area of the lens located between the two groups of second prisms. Diffusing means may also be provided over at least part of the area carrying prisms.

The invention includes a lens as aforesaid together with a reflecting device arranged to direct light through the lens. Preferably the reflector is parabolic in shape. A filament bulb may be located at the focus of the parabolic reflector.

The lens as aforesaid may be formed of moulded plastics material.

Preferably the first and second sets of prisms are provided on the rear face of the lens. The lens elements may be formed on the front face of the lens.

The invention also includes a pedal cycle headlamp incorporating a lens as aforesaid. The cycle lamp may be battery operated.

BRIEF DESCRIPTION OF THE DRAWINGS

FIG. 1 is a section through a battery operated pedal cycle headlamp in accordance with the present invention, FIG. 2 is a front view of the lens used in the cycle lamp of FIG. 1, FIG. 3 is a vertical section on the line 3—3 in FIG. 2, FIG. 4 is a horizontal section on the line 4—4 in FIG. 2, FIG. 5 shows a view similar to FIG. 3 illustrating the optical paths through the horizontal prisms, and FIG. 6 is a view similar to FIG. 4 showing the optical paths through one set of vertical prisms.

DESCRIPTION OF THE PREFERRED EMBODIMENT

In this example, a pedal cycle headlamp comprises a casing 11 incorporating two batteries 12. The casing is provided with a bracket 13 incorporating a spring member 14 arranged to engage a supporting bracket on a pedal cycle. A parabolic reflector 16 is attached to the front of the casing 11 and is provided with a filament bulb 17 centrally located at the focus of the parabolic reflector with the filament lying in a horizontal plane. The bulb 17 is connected via contacts 18 and 19 to the battery 12 and the supply of power to the bulb is controlled by a switch 20.

Bonded to the front rim of the reflector 16 is a lens 21 which is shown in more detail in FIGS. 2, 3 and 4. The lens comprises a generally planar member moulded from transparent plastics material and is of circular outline, as shown in FIG. 2. The lens 21 has a rear face 22 on which are formed a first set of prisms 23 and a second set of prisms 24. The front face 25 of the lens is formed with a plurality of lens elements 26 and diffusing areas 27a, 27b and 27c. These will now be described in greater detail. The first set of prisms 23 comprises a plurality of elongated parallel prisms extending horizontally. The prisms are of progressively decreasing length on moving away from the central axis of the lens. The whole set of first prisms 23 is symmetrically disposed relative to the vertical axis which coincides with the section line 3—3 marked in FIG. 2 and the prisms are all located above the central axis through the lens. Each of the prisms in the set 23 is of substantially the same height although the lowermost prism of the set is slightly higher than the rest. Each prism has an upper face which is inclined at an angle A relative to the perpendicular to the plane of the lens and a lower face which is inclined at an angle B to the perpendicular relative to the plane of the lens. The angle B for each prism in the set 23 is the same and is in this example 10°. The angle A does however vary for each of the prisms shown. In the example illustrated there are seven prisms in the set 23 and their respective angles A are 36¼°, 34¼°, 32¼°, 31°, 28¼°, 27° and 51° on moving from the uppermost prism to the lowermost prism. The effect of this prism structure is shown in FIG. 5 which shows the optical path of light passing through the prisms. Light 28 which comes directly from the bulb 17, up to an angle of about 65° above the horizontal, is deviated by refraction and reflection to form an emergent beam 29 lying between 10° above and 5° below the horizontal.

The second set of prisms 24 consists of two spaced groups 24a and 24b as shown in FIG. 2. The two groups of prisms are similar in formation and are symmetrically distributed on each side of the vertical axis through the centre of the lens. The two groups are spaced apart so as to leave a central region 31 below the first set of prisms 23 and between the two groups 24a and 24b. The central region 31 is formed by a part of the lens having parallel flat front and back faces. The area 31 is formed with a diffusing area 27b on the front surface of the lens. Each of the groups 24a and 24b of prisms are similarly formed by four vertical prisms, the prisms having upper ends adjacent the lowest prism of the first set 23 and each of the prisms extending a decreasing extent downwards on moving outwardly from the centre of the lens. As can be seen from FIG. 4, the vertical prism 24 nearest the centre of the lens has the greatest height and the prisms have successively decreasing heights on moving outwardly from the centre of the lens. Each vertical prism has an inner face inclined at an angle Y to the perpendicular to the plane of the lens and an outer face which is inclined at an angle X to the perpendicular to the plane of the lens. The inclination of the faces of the prisms varies and the angles Y for the four prisms of each set vary from 45°, 64¼°, 74¼° and 79° on moving from the innermost prism to the outermost prism of each group. The outward faces are inclined at angles X which vary from 33¼°, 46°, 54½° and 60° on moving from the inermost to the outermost prism. The optical paths of light passing through the second set of prisms 24 is shown in FIG. 6. Light 28 coming directly from the bulb 17 up to about 65° on either side of the axis of the lens is refracted by the prisms to give emergent beams 32 up to 82° from the axis of the lens on both sides of the axis.

As can be seen from FIG. 2, an annular region 34 surrounding the prisms 23 and 24 is provided with a series of parallel vertically elongated lens elements 26. The lens elements 26 cover the whole area of the annular region 34 apart from central regions 36 and 37 which lie in the central areas on the vertical axis through the lens. Two further rectangular diffusing areas 27a and 27c are provided on the front face of the lens and cover a substantial part of the vertical prisms 24 and the end regions of the lower prisms in the set 23.

As can be seen from the above description, the horizontal prisms 23 are used to modify the light distribution in the vertical direction and the vertical prisms 24 are used to modify the light distribution in the left and right horizontal directions. The lens elements 26 redistribute the light to provide sufficient light in otherwise weak light positions in the horizontal direction. The diffusing areas 27a, 27b and 27c help to achieve required light values at extreme positions to the left and right of the field of illumination of the lamp.

By using the particular configurations described above, the cycle lamp may be used to achieve the luminous intensity values required by British Standard BS AU 155, September, 1973. In particular the lamp provides a sufficiently defined high intensity zone of illumination. At no point at which light is visible more than 5° above the horizontal plane does the luminous intensity exceed 60 candelas when using fresh batteries. Furthermore, the lamp provides good spread of illumination to left and right and nowhere in the field of view 15° above or below the horizontal plane and between 80° left or right of the central axis of the lamp is the luminous intensity less than 0.05 candelas.

The invention is not limited to the details of the foregoing example.

I claim:

1. A lens for a pedal cycle headlamp including a light source for providing a parallel beam of light for passage through said lens, said lens comprising a transparent member adapted to fit the front of a cycle headlamp for impingement by said parallel beam of light, said member having formed thereon a first set of elongated prisms arranged to extend horizontally and to thereby modify the transmitted light distribution in the vertical direction and a second set of elongated prisms arranged to extend vertically and to thereby modify the transmitted light distribution in the horizontal direction, said second set of prisms comprising two groups of prisms symmetrically arranged on opposite sides of a central vertical axis of the lens, being spaced apart and remote from the center of the lens, and said first set of prisms being offset vertically from the center of the lens, thereby providing a central region of the lens through which light passes unmodified by said prisms, such that said lens when impinged upon by a parallel beam of light produces a predetermined pattern of luminous intensity values in both the horizontal and vertical planes with said first set of prisms deviating by refraction and reflection said parallel beam of light to near horizontal, and with said second set of prisms deviating by refraction said parallel beam of light to form an emergent beam of increased horizontal spread to the right and left of said central region of the lens.

2. A lens according to claim 1 wherein said central region is formed by part of the lens having flat parallel front and back faces.

3. A lens according to claim 1 wherein the first set of prisms is located symmetrically above the central axis of the lens.

4. A lens according to claim 1 wherein the prisms of the first set have faces of varying inclination to the plane of the lens so as to provide a desired modification of the light distribution.

5. A lens according to claim 4 wherein the prisms of the second set of prisms also have faces of varying inclination to the plane of the lens.

6. A lens according to claim 5 wherein the height of the prisms is varied by a progressive reduction in the height of the prisms on moving away from the centre of the lens.

7. A lens according to claim 1 wherein at least part of the lens area having no prisms is provided with elongated lens elements extending in a vertical direction.

8. A lens according to claim 7 wherein the lens elements are provided on an annular region of the lens surrounding the first and second sets of prisms.

9. A lens according to claim 1 wherein light diffusing means is provided on at least part of the area of the lens.

10. In combination, a lens, a parabolic reflector and a filament bulb at a focus of the parabolic reflector, said lens comprising a transparent member adapted to fit the front of a cycle headlamp for impingement by said parallel beam of light, said member having formed thereon a first set of elongated prisms arranged to extend horizontally and to thereby modify the transmitted light distribution in the vertical direction and a second set of elongated prisms arranged to extend vertically and to thereby modify the transmitted light distribution in the horizontal direction, said second set of prisms comprising two groups of prisms symmetrically arranged on opposite sides of a central vertical axis of the lens, being spaced apart and remote from the center of the lens, and said first set of prisms being offset vertically from the center of the lens, thereby providing a central region of the lens through which light passes unmodified by said prisms, such that said lens when impinged upon by a parallel beam of light produces a predetermined pattern of luminous intensity values in both the horizontal and vertical planes with said first set of prisms deviating by refraction and reflection said parallel beam of light to near horizontal, and with said second set of prisms deviating by refraction said parallel beam of light to form an emergent beam of increased horizontal spread to the right and left of said central region of the lens.

11. A battery operated pedal cycle headlamp comprising a light source emitting a parallel beam of light, a lens positioned in the path of said parallel beam of light, said lens comprising a transparent member adapted to fit the front of a cycle headlamp for impingement by said parallel beam of light, said member having formed thereon a first set of elongated prisms arranged to extend horizontally and to thereby modify the transmitted light distribution in the vertical direction and a second set of elongated prisms arranged to extend vertically and to thereby modify the transmitted light distribution in the horizontal direction, said second set of prisms comprising two groups of prisms symmetrically arranged on opposite sides of a central vertical axis of the lens, being spaced apart and remote from the center of the lens, and said first set of prisms being offset vertically from the center of the lens, thereby providing a central region of the lens through which light passes unmodified by said prisms, such that said lens when impinged upon by a parallel beam of light produces a predetermined pattern of luminous intensity values in both the horizontal and vertical planes with said first set of prisms deviating by refraction and reflection said parallel beam of light to near horizontal, and with said second set of prisms deviating by refraction said parallel beam of light to form an emergent beam of increased horizontal spread to the right and left of said central region of the lens.

* * * * *